United States Patent [19]

Hayashi et al.

[11] Patent Number: 4,710,782

[45] Date of Patent: Dec. 1, 1987

[54] CURRENT-APPLYING THERMAL TRANSFER FILM

[75] Inventors: Seiichi Hayashi; Takashi Nakamura, both of Nagano; Hisayuki Tanabe, Osaka, all of Japan

[73] Assignees: Seiko Epson Corporation, Tokyo; Nippon Kores Kabushiki Kaisha, Osaka, both of Japan

[21] Appl. No.: 901,332

[22] Filed: Aug. 28, 1986

[30] Foreign Application Priority Data

Aug. 29, 1985 [JP] Japan ................................ 60-190763

[51] Int. Cl.[4] ............................................. G01D 15/10

[52] U.S. Cl. .................................. 346/76 R; 346/105; 400/241.1

[58] Field of Search ............. 346/76 R, 76 PH, 135.1, 346/163, 105, 106; 219/216 PH; 400/241.1, 118–120, 241; 428/411.1, 412, 424.2, 424.07, 458, 477.4, 477.7, 488.4; 427/49, 43.1, 148

[56] References Cited

U.S. PATENT DOCUMENTS 4,309,117 6/1982 Chang et al. .................. 346/76 PH 4,400,100 8/1983 Aviram et al. .................... 346/76 R

*Primary Examiner*—Arthur G. Evans

*Attorney, Agent, or Firm*—Blum Kaplan

[57] ABSTRACT

A current activated thermal transfer film especially suitable as a non-impact printing ribbon is provided. The film has a thin uniform support layer with a resistance layer disposed on one surface and an ink layer is disposed on the opposed surface of the support layer. The resistance layer primarily includes conductive particles dispersed uniformly in a durable thermoplastic polyester copolymer resin.

15 Claims, 5 Drawing Figures

CURRENT-APPLYING THERMAL TRANSFER FILM

BACKGROUND OF THE INVENTION

This invention relates generally to ribbon-like current-activated thermal transfer films which are used for non-impact printing.

The thermal transfer method of non-impact printing utilizes a current head which applies current to the exothermic resistance layer of the transfer film. Heat is generated when this current flows through the resistance layer. This heats the ink of the ink layer which is thereby transfered onto the recording medium, such as paper. This method is more advantageous than the old methods with respect to the energy used for recording. It is also better suited for recording colors of varying tones than the prior art method which employed a thermal head. Attention has recently been focused on the former method due to this superiority of the new method.

A printer, utilizing a similar type of current-applying thermal transfer film had been released to the media with the trademark QUIET WRITER. This new thermal transfer method created a sensation, as was reported in Denpa Shinbun Newspaper on Oct. 18, 1984. The technology of this commercial product has been disclosed in several U.S. Pat. Nos. including 4,103,066, 4,291,994, 4,384,797, and 4,453,839.

The new thermal transfer printing is so efficient that printing can even be made on rough transfer paper, such as paper having a Beck smoothness of about 4 seconds. Notwithstanding these advantages, the following problems with this type of transfer film used have arisen.

The ribbon generally utilized in this new thermal transfer printing has a dual layer structure. This structure includes a resistance layer and an ink layer. The ink layer adheres directly to the resistance layer and there is no intermediate support layer to add dynamic strength. Therefore, because the film's dynamic strength is so poor, it is easily stretched and it is fragile. It is fragile because the resistance layer is constructed by dispersing conductive carbon black in a resin-type binder. The ink layer is principally pigment and resin which lacks strength. Additionally, the method for producing such thermal transfer films is more complicated than previous methods, production rate is extremely low, and therefore the costs of the printing ribbons made from these films are higher than the costs for the old type of ribbon. These high costs fall heavily on the user.

Accordingly, it is desirable to provide an improved thermal transfer sheet which takes advantage of this new thermal printing method, but overcomes the problems outlined above.

SUMMARY OF THE INVENTION

Generally speaking, in accordance with the invention, a current-applying thermal transfer film or ribbon is provided for the non-impact printing of characters and images. The ribbon includes a thin film-like support layer with a resistance layer on one surface and an ink layer on the opposed surface. The resistance layer includes about 10 to 40 wt % conductive dispersion particles (Ck), about 45 to 75 wt % thermoplastic copolymer, and about 2 to 15 wt % cellulose nitrate. Current flows through the resistance layer, generating heat which heat softens the ink which then adheres to the recording surface.

Accordingly, it is an object of the invention to provide an improved thermal transfer printing film.

It is another object of the invention to provide a thermal transfer ribbon having improved dynamic strength, dimensional stability, heat resistance, etc.

A further object of the invention is to provide thermal transfer films which are more economical.

Still another object of the invention is to provide thermal transfer films for improved printing quality.

Still a further object of the invention is to provide a thermal transfer printing film which avoids clogging of the current head due to adherence of a portion of the resistance layer between the recording electrodes of the current head.

Still other objects and advantages of the invention will in part the obvious and will in part be apparent from the specification.

The invention accordingly comprises a product possessing the features, properties, and the relation of components which will be exemplified in the product hereinafter described, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF PREFERRED EMBODIMENTS

The non-impact printing sheet in accordance with the invention includes three layers. A resistance layer is disposed on one surface of a support layer and an ink layer is disposed on the opposed surface. The resistance layer includes about 10 to 40 wt % of conductive dispersion particles (Ck); 45 to 75 wt % of a thermoplastic polyester copolymer (Cs). The thermoplastic polyester copolymer is made from a modified polyester composed mainly of terephthalic acid as the acid component and ethylene glycol as the divalent alcohol component. The resistance layer is soluble in a solvent mixture of methyl ethyl ketone and toluene in a weight mixing ratio of 1:1. The thermoplastic polyester copolymer should not have a melting point when measured with a diffential calorimeter. The resistance layer also contains about 2 to 15 wt % of cellulose nitrate (Cn) having a nitrogen content of about 10.7–12.2% and a viscosity of 100 to 300 seconds. The test method for viscosity is based on JIS K-6703. The total weight of the Ck+Cs+Cn portion of the resistance layer is between about 85 to 100 wt %. A suitable support layer can be made from biaxially stretched polyethylene terephthalate film having a thickness of about 1.0 to 10.0 μm.

The principle for non-impact printing utilizing the thermal transfer film of the invention involves applying a current to the current-applying transfer layer for causing thermally induced transfer of ink. The construction of the thermal transfer film will be explained in detail with reference to the drawings.

Figure 1:
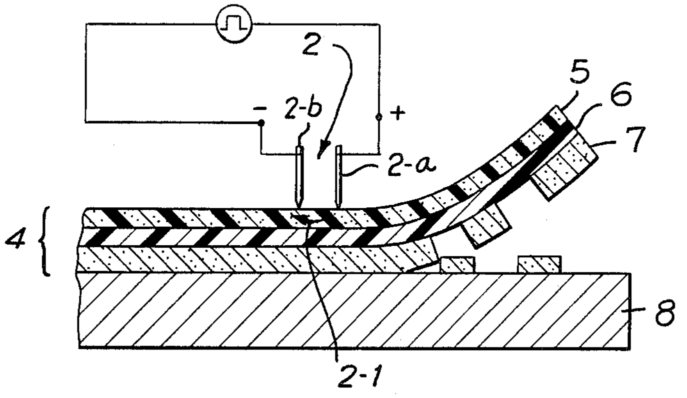
FIG. 1 is a cross-sectional view of a thermal transfer sheet prepared in accordance with the invention and the electrodes print head showing how ink is transferred to a print paper.

FIG. 1 is a drawing illustrating applying a current to a resistance layer 5 of a thermal transfer film 4 in accordance with the invention to perform non-impact thermal transfer. Thermal transfer film 4 is formed of a support layer 6 with a resistance layer 5 on one surface and an ink layer 7 on the opposed surface thereof.

In order to print, a pair of adjacent recording electrodes 2-*a* and 2-*b* of a current head 2 are brought into contact with the surface of resistance layer 5 under pressure. A current pulse is applied from recording electrode 2-*a* to recording electrode 2-*b* and current flows through a current path 2-1 in resistance layer 5. Ink layer 7 melts due to the heat generated by the current flowing through resistance layer 5. Ink in ink layer 7 is transferred onto recording medium, such as transfer paper 8.

Figure 2:
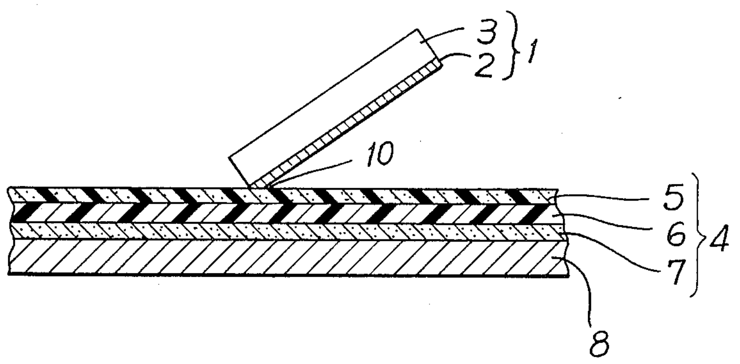
FIG. 2 is a cross-sectional view of a thermal transfer sheet prepared in accordance with the invention and a thermal transfer print head.

FIG. 2 is a cross-sectional elevational view of a current head 1 which includes a head base 3. There are an even number of recording electrodes 2 which are shown in contact with resistance layer 5 of thermal transfer film 4.

Support layer 6 of thermal transfer sheet 4 provides dynamic strength and must transfer heat generated into ink layer 7 quickly and accurately. Therefore, it is necessary for support layer 6 to be a thin material having high uniformity. Support layer 6 cannot deform during printing even though transfer film 4 is stretched from the pressure exerted by current head 1. Support layer 6 must also be heat resistant and relatively inexpensive. While a variety of thermoplastic materials which do not interfere with the ink layer are suitable, a biaxially stretched film of polyethylene terephthalate (PET) that is stretched and thermoset is preferred.

Support layer 6 of FIGS. 1 and 2 is a biaxially stretched PET film having a thickness of about 1.0 to 10.0 μm. If its thickness is less than about 1.0 μm, coating resistance layer 5 thereon becomes difficult and the dynamic strength of thermal transfer film 4 is poor. When the thickness exceeds about 10.0 μm, thermal efficiency is greatly decreased. A preferred thickness is between about 3.0 to 6.0 μm. In order to improve adhesion between support layer 6 and resistance layer 5 and to accelerate the ease of accurate stripping of ink layer 7 during printing, the biaxially stretched PET film can be subjected to surface treatment or surface coating prior to the construction of film 4.

Resistance layer 5 is made by dispersing conductive dispersion particles in a binder resin. Choice of binder resin significantly affects the thermal efficiency of thermal transfer film 4. High thermal efficiency leads to high quality printed characters and images. Although binder resins such as vinyl chloride-vinyl acetate copolymer, butyral, nitrocellulose and the like resins are suitable for dispersing conductive particles, these binders adhere poorly to biaxially stretched PET film. Therefore, such binders are not suitable as they are stripped off from PET film support layer 6 by the shearing force exerted by current head 1 which presses on resistance layer 5 during printing.

Thermoplastic polyester copolymer obtained by modifying polyester of terephthalic acid and ethylene glycol has been found to be an excellent choice for a binder resin. The polyester copolymer adheres well to PET film support layer 6, disperses the conductive particles well, and has good heat resistance. However, the polyester copolymer is not suitable to be used as a binder resin alone.

Figure 3:
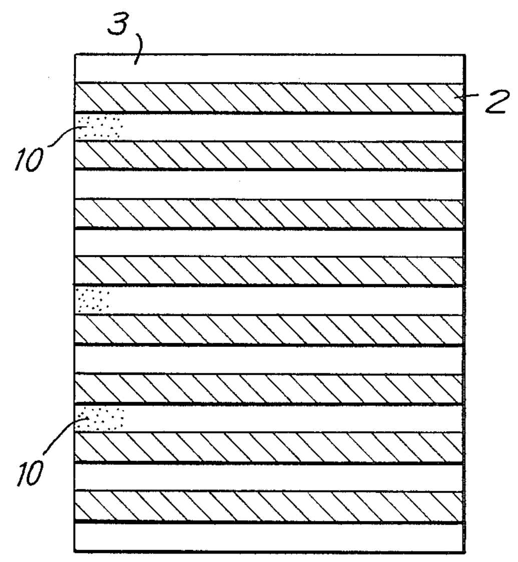
FIG. 3 is a top plan view of a current head for thermal transfer printing.
Figure 4:
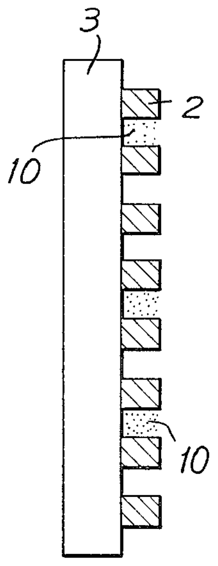
FIG. 4 is a cross-sectional view of the current head of FIG. 3.

The pressure of current head 1 is generally set in a range of 50 to 150 g/cm and the tensile force is in a range of 80 to 130 g/cm. These pressures are required for printing characters and images which have high quality. Pressure by recording electrodes 2 on resistance layer 5 creates a large shearing force between resistance layer 5 and support layer 6. When printing is performed as shown in FIG. 2, portions of resistance layer 5 can be scraped off from support layer 6 and adhere between recording electrodes 2 as shown in FIGS. 3 and 4. This portion which is scraped off continuously deposits at 10 and causes head 1 to clog. When head deposit 10 occurs, heat generation in that part of resistance layer 5 becomes non-uniform which causes printing errors. Dot omission can occur or in the worst case, white lines appear running along the direction of printing where no printing has occurred (white slip). To prevent head 1 from clogging when a thermoplastic polyester copolymer is used as a binder resin, it has been found that when a specific cellulose nitrate in a specific proportion is added to the thermoplastic polyester copolymer, head clogging is greatly reduced. The addition of cellulose nitrate does not reduce dispersibility of the conductive particles, the dynamic properties of the resistance layer, or heat resistance.

Adding cellulose nitrate (Cn) in an amount of about 2 to 15 wt % of resistance layer 5 greatly reduces head clogging which causes printing defects. In fact, full color images with picture quality close to silver halide color photographic images with minimal noise can be obtained. The cellulose nitrate which is suitable should have a nitrogen content of about 10.7 to 12.2% when measured by the JIS K-6703 method. Additionally, the viscosity should be between about 100 to 300 seconds (measured in a solid content of 12.2%). If the viscosity is less than about 100 seconds, it is less effective for its heat resistance qualities and for its reduction of head clogging. If the viscosity exceeds 300 seconds, it is effective for heat resistance, but dispersibility of conductive particles is poor and its effect of reducing head clogging is lessened.

The thermoplastic polyester copolymer referred to above is a polyester containing 40 to 70 mol % of terephthalic acid as the acid component and 40 to 70 mol % of ethylene glycol as the divalent alcohol component. There must be an additional acid and an additional divalent alcohol component. As the other acid component, at least one of the following is included: isophthalic acid, phthalic acid, adipic acid, sebacic acid and trimellitic acid. As the other divalent alcohol component, at least one of the following is included: tetramethylene glycol, neopentyl glycol, pentaerythritol, trimethylolpropane, ethylene oxide addition product of bisphenol A and the like.

To improve the dispersibility of the conductive particles, adherence of resistance layer 5 to support layer 6 and resistance to heat, the polyester copolymer resin should be soluble in a solvent. Preferably, the polyester copolyer is soluble in a solvent mixture of methyl ethyl ketone (MEK) and toluene in a 1:1 weight mixing ratio.

The polyester described above gives the resin excellent solubility properties, disperses the conductive particles well and the dispersion coats well upon drying. The coated layer is also uniform and adheres well to PET support film 6.

It is necessary that the polyester copolymer does not have an exothermic peak based on melting of crystals (melting point) when heated by elevating its temperature with a differential calorimeter (DSC). This was tested with a sample amount of about 10 to 13 mg, with a temperature elevation rate of 10° C. per minute, from room temperature to 270° C. If polyester copolymer having a exothermic peak is used as a binder in resistance layer 5, the conductive particles will not disperse well. This results in unevenness in the resistance value of resistance layer 5. The unevenness occurs particularly in a range of 100 to 300 $\mu$m increases. Additionally, resistance layer 5 will not adhere well to PET support layer 6. This allows resistance layer 5 to be removed from support layer 1 under the 50 to 150 g/cm pressure exerted by current head 1 during printing.

Conductive particles dispersed in the binder resin of resistance layer 5 allow current to flow between recording electrodes 2. Examples of the conductive dispersion particles include metal powders, such as aluminum, copper, iron, lead, zinc, nickel, molybdenum, silver, etc.; zinc oxide, titanium dioxide; carbon black powders such as graphite, acetylene black, etc. Preferred examples of the conductive particles include Ketschen B (Trademark made by AKZO Co., Ltd. in Netherlands), Black Pearls 2000 (Trademark of Cabot Co., Ltd., USA) Balcan SC 72 (Trademark of Cabot Co., Ltd., USA), etc.

Resistance layer 5 includes at least three necessary components, the conductive particles, the thermoplastic copolymer and cellulose nitrate. Among the solid components, the conductive particles (Ck) are present in an amount between about 10 to 40 wt %. When the thickness of the resistance layer is between about 3.5 to 4.0 $\mu$m in this content, the surface resistance value can be set at 0.5 to 5 kΩ/□. When the (Ck) content exceeds 40 wt %, resistance layers become fragile. This can cause both head clogging and partial stripping of resistance layer 5.

The polyester resin (Cs) is present in the resistance layer in an amount between about 45 to 75 wt %. If the content is less than about 45 wt %, partial stripping of resistance layers occurs during printing. When the content exceeds about 75 wt %, head clogging tends to occur.

The cellulose nitrate (Cn) content in the resistance layer is between about 2 to 15 wt %. When cellulose nitrate is present in a relatively small amount, head clogging is greated reduced. But when it is present in an amount less than about 2 wt %, it does not reduce head clogging effectively. When the ocntent of cellulose nitrate (Cn) exceeds about 15 wt %, it is effective for heat resistance, but partial stripping of resistance layer 5 occurs during printing and curling of the thermal transfer film occurs.

The sum of the precentages of the three solid constituent components described above, Ck+Cs+Cn, is between about 85 to 100 wt % of the total weight of resistance layers. In addition to these three components, a dispersing agent, a moisture-proof agent, a softener, an anti-static agent, an anti-oxidant, a heat resistance reinforcing agent, an adhesion-reinforcing agent; a resin such as polyurethane, a vinyl chloride-vinyl acetate copolymer, butyral, etc., can also be added in the amount of about 0 to 15 wt %.

The invention will be described with reference to the following examples which are set forth for the purpose of illustration and not in a limiting sense. The amounts (%) of the components described in the Examples are all by weight percent.

Adherence between the resistance layer and the support layer PET film and head clogging were evaluated by the following measurement methods.

(1) Adherence

A PET film, coated with a resistance layer, was put on a steel plate and the resistance layer was cross-cut off by 1 mm for 10 vertical lines and 10 horizontal lines under such a load that the PET film was not cut. This left approximately 100 "square boxes" of resistance layer adhered to the support layer. This was followed by stripping off the resistance layer boxes with adhesive tape. The number of boxes left unstripped was considered a measure (%) of adherence. The number of boxes remaining was measured with a traveling cut-off tester (made by Toyostikio, Ltd.).

(2) Head Clogging

Figure 5:
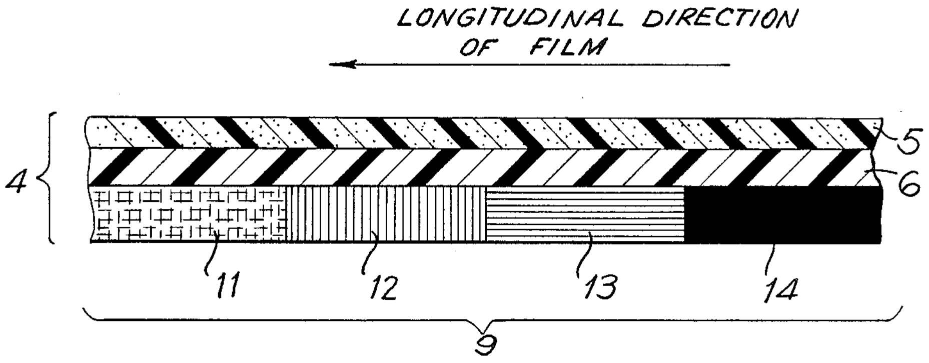
FIG. 5 is a cross-sectional view of a thermal transfer sheet prepared in accordance with another embodiment of the invention.

An ink layer 9 prepared by dispersing pigments of yellow (11), magenta (12), cyan (13) and black (14) in a wax-type binder as shown in FIG. 5 was repeatedly coated (colored striped) in the longitudinal direction of a thermal transfer film. A female image was continuously printed in full colors onto 100 sheets of $A_6$ size thermal transfer paper (Mitsubishi Paper Mills, Ltd.) by means of a current-applying thermal transfer apparatus recording electrodes, of the type illustrated in FIGS. 1 and 2. A variety of thermal transfer films having a three-layer structure of support layer 6 with resistance 5 on one surface and ink layer 7 on the opposed surface was used. Resistance layers 5 of various compositions as shown in Table 1 were prepared. The degree of reduction in image quality which was due to white slip images caused by head clogging was evaluated with the naked eye and subjectively labeled ◎, Δ or X.

In Table 1, ◎ represents images which are very close to silver halide full color photography;

Δ represents images which are considerably inferior to silver halide photography because of substantial generation of striped stains and dark stains due to white slip or dot omission; and X represents images which are even more inferior than silver halide full color photography.

EXAMPLES

The various thermal transfer films evaluated for adherence and clogging were prepared as follows.

(1) Resistance layer

Ketscheng Black EC (Lion Akzo Co., Ltd.) was used as conductive particles and was dispersed in various binder resins using an organic solvent. Each dispersion was coated with a gravure roll coater. The dry thickness of the resistance layer was 4.0 to 4.5 $\mu$m and the surface resistance value was 1.8 to 2.0 k Ω/□.

(2) Support Layer

A biaxially stretched PET film having a thickness of 6 $\mu$m (Toray, Co., Ltd. 6CF).

(3) Ink Layer

A pigment mixture of 10 wt % yellow, magenta, cyan and black, 40 wt % paraffin wax (Dia Nippon Seiro K.K., S.P. 1045), oxidized wax (Dia Nippon Siero K.K., N.P.S.-9125) and ethylene-vinyl acetate copolymer (Mitsui du Pont PolyChemical Co, Ltd. E.D. 420) was kneaded and dispersed. The dispersion was coated by the hot melt method using a gravure roll coater. Each ink layer was coated in color stripes in the longitudinal direction of the film as shown in FIG. 3 to create a current-applying thermal transfer film having a size capable of printing onto a $A_6$ sized recording paper. The thickness of the ink layer was 4.5 to 5.0 μm in each color.

Full color transfer conditions are as follows:

(a) Current Head (Line Head)
Dot pitch: 6 dots/mm
Line Pitch: 6 dots/mm
Width of recording electrodes: 80 μm
(b) Driving Conditions
voltage applied: 20 V
Pulse with modulation: 50 μsec. to 1.5 m sec.
Gradations: 64

EXAMPLES 1-5 AND COMPARATIVE EXAMPLES 1-9

Printing was performed by varying the type and percentage of binder resin in the resistance layer and the percentage of carbon black. Adherence and white slip or dot ommission due to head clogging were subjectively evaluated. The results are shown in the following table.

(Comparative Examples 4 and 5). When the resin is polyester alone and does not contain cellulose nitrate, adherence is good, but there is a reduction in image quality due to head clogging. (Comparative Examples 6 and 7). However, when the resin containes cellulose nitrate, if the percentage is too low, reduction in image quality due to head clogging occurs. (Comparative Example 8).

Examples 1-5 set forth thermal transfer films prepared in accordance with the invention demonstrate marked improvements in adherence and reduction of head clogging.

When the content of the conductive particles is excessively large, adherence is poor and image quality is worsened due to head clogging. (Comparative Example 9).

As described in detail hereinbefore, an inexpensive current-applying thermal transfer film may be provided in accordance with the invention which has excellent properties. For example, the films have improved dynamic properties, particularly tensile resistance against a tensile force under pressure of the head and strong fragility resistance; provide firm adhesion between the resistance layer and the support layer; have greatly reduced occurrence of head clogging between the recording electrodes from the pressure of a head during printing; and provide printed matters of high quality. The films prepared in accordance with the invention are those having a structure of at least three layers and include a binder resin for the resistance layer of a specific thermoplastic polyester copolymer and cellulose nitrate in the specified ratio to the conductive particles

TABLE I

| | Binder Resin for Resistance Layer | | | | | Amount | | |
|---|---|---|---|---|---|---|---|---|
| | Kind of Resin | Manufacturer | Brand | Characteristic Value | Amount of Resin (%) | of Carbon Black (%) | Adhesive Property (%) | Image Quality (head-clogging |
| Comp. Ex. 1 | VCl/VA | Union Carbide | UCAR-VAGH | VCl/VA = 90/4% | 75 | 25 | 33 | X |
| Comp. Ex. 2 | VCl/VA | Union Carbide | UCAR-VAGH | | 65 | 25 | 30 | X |
| | Cellulose nitrate | Daicel | RS-200 | N content, 12.1%, viscosity (212 secs., measured in solid content of 12.2%) | 10 | 25 | | |
| Comp. Ex. 3 | Butyral | Sekisui Kagaku | ESREK BBMS | Ac group, 4-6%; butyral group, 70% | 75 | 25 | 18 | X |
| Comp. Ex. 4 | Polyester | Toyo Spinning | Byron GM1900 | m.p. (110° C.), insoluble in MEK/toluene = 1:1 | 75 | 25 | poor dispersion of carbon black | |
| Comp. Ex. 5 | Polyester | Toyo Spinning | Byron 30P | m.p. (122° c.), same as above | 75 | 25 | | |
| Comp. Ex. 6 | Polyester | Toyo Spinning | Byron 290 | no m.p., soluble in MEK/toluene = 1/1 | 75 | 25 | 92 | Δ |
| Comp. Ex. 7 | Polyester | Toyo Spinning | Byron 600 | no m.p., same as above | 75 | 25 | 96 | Δ |
| Comp. Ex. 8 | Polyester | Toyo Spinning | Byron 290 | | 74.5 | 25 | 93 | Δ |
| | Cellulose nitrate | Daicel | RS-200 | | 0.5 | | | |
| Ex. 1 | Polyester | Toyo Spinning | Byron 600 | | 72 | 25 | 94 | O |
| | Cellulose nitrate | Daicel | RS-200 | | 3 | | | |
| Ex. 2 | Polyester | Toyo Spinning | Byron 600 | | 67 | 25 | 98 | O |
| | Cellulose nitrate | Daicel | RS-200 | | 8 | | | |
| Ex. 3 | Polyester | Toyo Spinning | Byron 600 | | 65 | 25 | 95 | O |
| | Cellulose nitrate | Asahi Chemical | HIG 120 | N content (11.5-12.2%), viscosity (110-14) sec., measured in solid content of 12.2%) | 10 | | | |
| Ex. 4 | Polyester | Goodyear Tire & Rubber | Baitel PE-222 | No m.p., soluble in MEK/toluene = 1/1 | 67 | 25 | 95 | O |
| | Cellulose nitrate | Asahi Chemical | HIG 120 | | 8 | | | |
| Ex. 5 | Polyester | Toyo Spinning | Byron 290 | | 57 | 35 | 84 | O |
| | Cellulose nitrate | Daicel | RS-200 | | 8 | | | |
| Comp. Ex. 9 | Polyester | Toyo Spinning | Byron 290 | | 57 | 45 | 47 | Δ |
| | Cellulose nitrate | Daicel | RS-200 | | 8 | | | |

When the resin utilized in the resistance layer does not contain polyester resin, adherence is extremely poor (comparative Examples 1-3). In these cases, head clogging also occurs and image quality is extremely poor. In the case when the resin tested is a polyester resin having a melting point and is insoluble in MEK/toluene, the conductive particles could not be dispersed uniformly and using a biaxially stretched PET film for the support layer.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed:

1. A current-applying thermal transfer film, comprising:

a support layer;

a current-applying exothermic resistance layer disposed on one surface of the support layer, the resistance layer including about 10 to 40 wt % conductive dispersion particles (Ck), about 45 to 75 wt % thermoplastic polyester copolymer (Cs), and about 2 to 15 wt % cellulose nitrate; and an ink layer disposed on the opposed surface of the support layer.

2. The current-applying thermal transfer film of claim 1, wherein the support layer is polyethylene terephthalate.

3. The current-applying thermal transfer film of claim 1, wherein the support layer is biaxially stretched polyethylene terephthalate that is stretched and thermoset.

4. The current-applying thermal transfer film of claim 1, wherein the conductive dispersion particles are selected from the group consisting of metal powders of aluminum, copper, iron, lead, nickel, molybdenum and silver, zinc oxide, titanium dioxide, carbon black powders, graphite and acetylene black.

5. The current-applying thermal transfer film of claim 1, wherein the thermoplastic polyester copolymer is formed from about 40 to 70 mol % terephthalic acid and 40 to 70 mol % ethylene glycol and at least one additional acid component and at least one additional divalent alcohol component.

6. The current-applying thermal transfer film of claim 5, wherein the additional acid component is selected from the group consisting of isophthalic acid, phthalic acid, adipic acid, sebacic acid and trimellitic acid.

7. The current-applying thermal transfer film of claim 5, wherein the additional divalent alcohol component is selected from the group consisting of tetramethylene glycol, neopentyl glycol, pentaerythritol, trimethylopropane and the ethylene oxide addition product of bisphenol A.

8. The current-applying thermal transfer film of claim 1, wherein the thermoplastic polyester copolymer is soluble in a solvent mixture of methyl ethyl ketone and toluene.

9. The current-applying thermal transfer film of claim 1, wherein the thermoplastic polyester copolymer does not have a melting point when measured with a differential calorimeter.

10. The current-applying thermal transfer film of claim 1, wherein the thermoplastic polyester copolymer is soluble in a solvent mixture of methy ethyl ketone and toluene in weights-mixing ratio of 1:1 and does not possess any melting point when measured with a differential calorimeter.

11. The current-applying thermal transfer film of claim 2, wherein the polyethlene terephthalate support layer has a thickness of about 1 to 10 $\mu$m.

12. The current-applying thermal transfer film of claim 1 wherein, the cellulose nitrate has a viscosity of 100 to 300 seconds using a JIS K-6703 test method.

13. The current-applying thermal transfer film of claim 1, wherein cellulose nitrate has a nitrogen content of between about 10.7 to 12.2%.

14. The current-applying thermal transfer film of claim 1, wherein the total content of Ck+Cs+Cn is about 85–100 wt % of the resistance layer.

15. The current-applying thermal transfer film of claim 14, wherein the remainer of the resistance layer is selected from the group the consisting of a dispersing agent, a moisture-proof agent, a softener, an anti-static agent, an antioxidant, a heat resistance-reinforcing agent, an adhesion-reinforcing agent and an additional resin selected from the group consisting of a polyurethane resin, a vinyl cloride - vinyl acetate copolymer, and butyral.

* * * * *